United States Patent
Hayashi

(10) Patent No.: US 6,903,172 B2
(45) Date of Patent: Jun. 7, 2005

(54) CATIONICALLY POLYMERIZABLE COMPOSITION

(75) Inventor: Akiko Hayashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 10/405,221

(22) Filed: Apr. 3, 2003

(65) Prior Publication Data

US 2003/0191256 A1 Oct. 9, 2003

(30) Foreign Application Priority Data

Apr. 5, 2002 (JP) ........................................ 2002-104018

(51) Int. Cl.$^7$ ................................................. C08F 4/32
(52) U.S. Cl. ........................ 526/204; 526/209; 526/211; 526/236
(58) Field of Search ................................ 526/236, 211, 526/209, 204

(56) References Cited

U.S. PATENT DOCUMENTS 6,579,959 B2 * 6/2003 Yoshimi et al. ............. 526/209

* cited by examiner

*Primary Examiner*—William K. Cheung
(74) *Attorney, Agent, or Firm*—Kendrew H. Colton; Fitch Even Tabin & Flannery

(57) ABSTRACT

A cationically polymerizable composition is provided, which comprises a cationically polymerizable compound, a cationic polymerization initiator, and a specific tertiary alkanolamine or tertiary alkylamine. The cationically polymerizable compound is preferably an alicyclic epoxy compound and an oxetane compound. The above amine accounts for 0.01 to 1.0% by weight, preferably 0.05 to 0.5% by weight of the total of the cationically polymerizable composition and the cationic polymerization initiator accounts for 0.1 to 20 parts by weight based on 100 parts by weight of the cationically polymerizable compound. The composition is excellent in storage stability and dispersion stability of colorants contained therein.

10 Claims, No Drawings

CATIONICALLY POLYMERIZABLE COMPOSITION

BACKGROUND OF THE INVENTION

1. Field of the Invention

This invention relates to a cationically polymerizable composition excellent not only in storage stability but also in colorant-dispersion stability.

2. Description of the Related Art

Ink compositions, which undergo radical polymerization and curing when irradiated with active energy beams such as ultraviolet rays, have been known as quick-drying printing inks. These ink compositions, however, have given rise to a problem of being subjected to curing inhibition in the presence of oxygen.

Thus, in recent years, there have been proposed ink compositions which undergo cationic polymerization and curing when irradiated with active energy beams. As these ink compositions, have been proposed those including an oxetane compound, a cationic photopolymerization initiator and a pigment, and further including an epoxy compound when needed (Japanese Patent Laid-Open No. 8-143806). Cationic polymerization is advantageous in that it is not inhibited by oxygen, it does not have to be performed in an inert atmosphere, and it can be performed quickly and completely in the air, since it is initiated in the presence of cation generated from a cationic polymerization initiator when the initiator is irradiated with ultraviolet rays or the like.

However, when cationically polymerizable compounds such as oxetane compounds and epoxy compounds are stored with a cationic polymerization initiator added thereto for a long period of time, cation can sometimes be generated spontaneously from the cationic polymerization initiator even in a state of ultraviolet rays being blocked, and there sometimes occurs a problem that the cation initiates the polymerization of the cationically polymerizable compounds, causing thickening and gelation.

In order to solve such a problem, Japanese Patent Laid-Open No. 2000-186079 has proposed to improve the storage stability of the oxetane compound without deteriorating ring opening polymerizability of the oxetane compound by adding a basic compound, for example, a basic organic compound such as an amine to the oxetane compound, and has described, as such an amine, octylamine, naphthylamine, xylenediamine, dibenzylamine, diphenylamine, dibutylamine, dioctylamine, dimethylaniline, quinuclidine, tributylamine, trioctylamine, tetramethylethylenediamine, tetramethyl-1,6-hexamethylenediamine, hexamethylenetetramine and triethanolamine.

However, even the addition of such an amine cannot necessarily produce a sufficient effect of inhibiting the cationically polymerizable compound from polymerizing, and particularly when the cationically polymerizable compound is a mixture of an oxetane compound and an alicyclic epoxy compound, its storage stability is often unsatisfactory. Moreover, when a colorant is added thereto so that it is used as an ink, the colorant sometimes agglomerates to deteriorate its dispersion stability.

Accordingly, an object of this invention is to provide a technique which permits improvement in storage stability of a cationically polymerizable compound containing a cationic polymerization initiator, and in addition, ensures dispersion stability of colorants.

SUMMARY OF THE INVENTION

According to one aspect of this invention, a cationically polymerizable composition is provided, which is characterized in that it comprises a cationically polymerizable compound, a cationic polymerization initiator and a compound having the following general formula I:

wherein R is a group represented by —$(C_nH_{2n})$OH (n is an integer of 2 or more) or —$(C_mH_{2m+1})$ (m is an integer of 3 or more) and may be either of straight-chain or branched-chain.

According to another aspect of this invention, a method for stabilizing a cationically polymerizable composition is provided, which is characterized in that it comprises adding a compound having the following general formula I:

wherein R is a group represented by —$(C_nH_{2n})$OH (n is an integer of 2 or more) or —$(C_mH_{2m+1})$ (m is an integer of 3 or more) and may be either of straight-chain or branched-chain, to a cationically polymerizable composition comprising a cationically polymerizable compound to which a cationic polymerization initiator is added.

The cationically polymerizable composition of this invention can be provided in a form of a solvent-free and one-pack type of active energy beam-curable or heat-curable composition which contains a cationically polymerizable compound, a cationic polymerization initiator and a compound having the above general formula I, that is, a specific tertiary alkilamine or tertiary alkanolamine. The composition generates cation from the cationic polymerization initiator when irradiated with an active energy beam, and the action of the cation initiates polymerization of the cationically polymerizable compound and cures the same. It can be considered that the compound having the above general formula I exists as an electron donor in the composition during storage, and even when cation is generated from the cationic polymerization initiator, it traps the cation and functions as a polymerization inhibitor, thereby inhibiting gelation of the composition and permitting stable storage of the same. While not wishing to be bounded by theory, it is believed that since the compound having the above general formula I, which is used in this invention, has not only a moderate steric hindrance and a high nucleophilicity, but also a structure which makes it easy to bond unshared electron pair of nitrogen atoms and cation together, it largely contributes to the improvement in storage stability of a cationically polymerizable compound.

DETAILED DESCRIPTION OF THE PREFERRED EMBODIMENTS

The cationically polymerizable compounds include, for example, cationically polymerizable vinyl compounds, lactones and cyclic ethers. The cationically polymerizable vinyl compounds include, for example, styrene and vinyl ether.

The cyclic ethers include, for example, epoxy compounds, oxetane compounds, spiroorthoesters, bicycloorthoesters and cyclic carbonates.

The epoxy compounds mean the compounds having an oxirane group which is a three membered ring having the following formula (1) and include an aromatic epoxy compound, an alicyclic epoxy compound and the like.

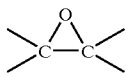

(1)

The oxetane compounds mean the compounds having an oxetane ring which is a four membered ring ether having the following formula (2).

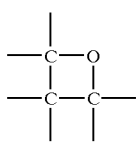

(2)

The preferable cationically polymerizable compounds are cyclic ethers which undergo ring opening polymerization by the action of cation, more preferably alicyclic epoxy compounds and oxetane compounds. It is particularly preferable to use an alicyclic epoxy compound and an oxetane compound in a mixed state, since the mixture is excellent in curability. In this case, weight ratio of an alicyclic epoxy compound to an oxetane compound (alicyclic epoxy compound/oxetane compound) in the mixture is usually 5/95 to 95/5, preferably 10/90 to 50/50. If the amount of oxetane compound is too small, flexibility and solvent resistance of cured products tend to deteriorate. Conversely, if the amount of oxetane compound is too large, risk of inadequate curing is increased under highly humid environment.

The preferable oxetane compounds include, for example, 3-ethyl-3-hydroxymethyloxetane, 1,4 bis{[(3-ethyl-3-oxetanyl)methoxy]methyl}benzene, 3-ethyl-3-(phenoxymethyl)oxetane, 3-ethyl-3-(2-ethylhexyloxymethyl)oxetane and di[1-ethyl(3-oxetanyl)]methyl ether.

The preferable alicyclic epoxy compounds include, for example, 3,4-epoxycyclohexylmethyl-3',4'-epoxycyclohexane carboxylate (commercially available under the trade names of UVR6105, UVR6110 and CELLOXIDE2021), bis(3,4-epoxycyclohexylmethyl) adipate (commercially available under the trade name of UVR6128), vinylcyclohexene monoepoxide (commercially available under the trade name of CELLOXIDE2000), ε-caprolactone modified 3,4-epoxycyclohexylmethyl 3',4'-epoxycyclohexane carboxylate (commercially available under the trade name of CELLOXIDE2081), and 1-methyl-4-(2-methyloxyranyl)-7-oxabicyclo[4,1,0]heptane (commercially available under the trade name of CELLOXIDE3000). The commercial compounds having the trade names of UVR6105, UVR6110 and UVR6128 are available from The Dow Chemical Company. The commercial compounds having the trade names of CELLOXIDE2000, CELLOXIDE2021, CELLOXIDE2081 and CELLOXIDE3000 are all available from Daicel Chemical Industries, Ltd. UVR6105 is a low-viscosity product of UVR6110.

Concrete examples of cationically polymerizable compounds are described in further detail in, for example, Japanese Patent Laid-Open No. 8-143806, Japanese Patent Laid-Open No. 8-283320, Japanese Patent Laid-Open No. 2000-186079 and Japanese Patent Laid-Open No. 2000-327672, and this invention can be carried out using a compound appropriately selected from the examples shown in the above references.

The cationic polymerization initiators include, for example, not only commonly known sulfonium salts and ammonium salts, but also diaryl iodonium salts and triaryl sulfonium salts, and one appropriately selected from those described in, for example, Japanese Patent Laid-Open No. 8-143806 and Japanese Patent Laid-Open No. 8-283320 can also be used. The commercial cationic polymerization initiators can also be used as they are. The typical examples of the commercial cationic polymerization initiators include, for example, those available under the trade names of CI-1370, CI-2064, CI-2397, CI-2624, CI-2639, CI-2734, CI-2758, CI-2823, CI-2855 and CI-5102 (all manufactured by Nippon Soda Co., Ltd.), PHOTOINITIATOR2074 (manufactured by Rhodia), and UVI-6974 and UVI-6990 (manufactured by The Dow Chemical Co.).

Although an amount of the cationic polymerization initiator to be added varies depending on its kind, kind and proportion of the cationically polymerizable compound to be used, and conditions under which it is used, the amount is usually 0.1 to 20 parts by weight, preferably 0.5 to 10 parts by weight, more preferably 1 to 5 parts by weight, based on 100 parts by weight of the cationically polymerizable compound in the composition. If the amount of the cationic polymerization initiator is large, polymerization progresses promptly, but storage stability of the composition is likely to deteriorate. Conversely, if the amount is small, the curability becomes poor.

Concrete examples of the compounds having the above general formula I, which is used in this invention, include, for example, monovalent tertiary alkanolamines such as dimethylaminoethanol, dimethylamino-2-propanol and dimethylaminomethylpropanol; and tertiary alkylamines such as dimethylisopropylamine and dimethyloctylamine. Of the above compounds, the compounds whose R is a group represented by the formula —$(C_nH_{2n})$OH (n is an integer of 2 to 4) or —$(C_mH_{2m+1})$ (m is an integer of 3 to 8) are preferable and the compounds whose R is a group represented by the formula —$(C_nH_{2n})$OH (n is 3 or 4) or —$(C_3H_7)$ are more preferable, and preferably R is branched. Of these compounds, dimethylamino 2-propanol, dimethylaminomethylpropanol, and dimethylisopropylamine are preferably used in ink applications because of their excellent colorant-dispersion stability.

In this invention, though the content of the compound having the above general formula I in the composition varies depending on kind and proportion of the cationically polymerizable compound to be used, kind and proportion of the cationic polymerization initiator, and storing and curing conditions of the composition, the content is usually 0.01 to 1.0% by weight, preferably 0.05 to 0.5% by weight, based on the total of the cationically polymerizable composition. If the content of the compound having the above general formula I is insufficient, storage stability of the cationically polymerizable compound cannot be fully improved. Conversely, if the content of the compound having the above general formula I is excessive, poor curing is caused.

The cationically polymerizable composition of this invention can be produced by thoroughly mixing a cationically polymerizable compound, a cationic polymerization initiator and a compound having the above general formula I. Further, if a compound having the above general formula I is added to and thoroughly mixed with an existing cationically polymerizable composition or ink composition that contains a cationically polymerizable compound and a cationic polymerization initiator, the composition is improved in storage stability without deteriorating colorant dispersion.

Viscosity of the cationically polymerizable composition of this invention can be appropriately adjusted by selecting a molecular weight of cationically polymerizable compounds or combination thereof according to applications of the composition. Particularly when the composition of this invention is used as an ultraviolet-curing ink or its vehicle for ink jet printers for business use, the viscosity is adjusted to be 5 to 50 mPa·s, preferably 10 to 30 mPa·s at 23° C.

The colorants which can be mixed with the cationically polymerizable composition of this invention include, for example, pigments and dyes; and as pigments can be used inorganic pigments such as carbon black, acetylene black, lamp black, titanium oxide, chrome yellow and ultramarine, and organic pigments such as azo-based pigments, phthalocyanine-based pigments and quinacridone; as dyes can be used azo-based dyes and anthraquinone-based dyes. The amount of the colorant to be added is usually 0.1 to 30 parts by weight, preferably 1 to 15 parts by weight with respect to 100 parts by weight of the cationically polymerizable compound.

The cationically polymerizable composition of this invention is allowed to initiate polymerization reaction and be cured by irradiation of active energy beams such as ultraviolet rays, X rays, and electron beams or heating, as in the conventional procedure.

To the composition of this invention, can be added various kinds of additives such as not only colorants, but also dispersants, sensitizers, flame retarders, antistatic agents and surfactants, if desired. These compositions are suitably used for inks and vehicles thereof, polishing varnishes, coatings, adhesives, prepregs, sealing materials, laminates and molding materials.

EXAMPLES

Although this invention will be described in further detail with reference to several examples, it is to be understood that these examples are intended for illustrative purpose only and not intended to limit this invention.

The methods for testing compositions were as follows.
Curability Test

A thin film (10 μm thick) of each composition was formed on one side of a polyethylene terephthalate (PET) film. The obtained film was passed at a belt speed of 20 m/min under an 80-watt high-pressure mercury lamp so that the thin film was irradiated with ultraviolet rays. The thin film immediately after the irradiation was felt with fingers and whether the thin film was cured or not was evaluated based on the following criteria.
Curability Evaluation Criteria:
  Good: Cured
  Poor: Not cured
Storage Stability Test After measuring the initial viscosity ($V_o$) of each composition, the composition was subjected to an accelerated test in a high-temperature environment of about 70° C. while being kept in a container with the lid of the container closed (in a closed system), and the viscosities of the composition one week and four weeks later ($V_1$ and $V_4$ respectively) were measured. Rate of viscosity change was obtained in accordance with the equation: $V_4/V_o$.
Measurement of Viscosity The viscosity of each composition was measured using an E type viscometer (manufactured by Toki Sangyo Co., Ltd.) at a temperature of 23° C. and at a rotation speed of 10 rpm.
Colorant-Dispersion Stability Test After measuring the initial particle size ($D_o$) of pigments in each composition, the composition was subjected to an accelerated test in a high-temperature environment of about 70° C. while being kept in a container with the lid of the container closed (in a closed system), and the particle sizes of the pigment were measured one week and four weeks later ($D_1$ and $D_4$ respectively). Rate of particle size change was obtained in accordance with the equation: $D_4/D_o$.
Measurement of Particle Size As the particle size of the pigment in each composition, the mean particle diameter measured with a dynamic light scattering particle size distribution analyzer (manufactured by Horiba, Ltd.) was used.

Examples 1 to 5, Comparative Examples 2 and 3

Cationically polymerizable compositions were obtained by thoroughly mixing an alicyclic epoxy compound, an oxetane compound, a cationic polymerization initiator, carbon black (pigment), a pigment dispersant, a compound having the above general formula I in accordance with the formulation shown in Table 1. The obtained compositions were subjected to the above described tests and measurements to be evaluated. The results are shown in Table 2.

Comparative Example 1

A composition was obtained in the same manner as Example 1, except that the compound having the above general formula I was not added.

TABLE 1

|  | Alicyclic Epoxy Compound CELLOXIDE 3000 (part by weight) | Oxetane Compound OXT221 (part by weight) | Cationic polymerization Initiator UVI6990 (part by weight) | Pigment MA11 (part by weight) | Pigment Dispersant sol. 24000 (part by weight) | Amines Kind Amount of Amine Added (0.3 part by weight) |
|---|---|---|---|---|---|---|
| Example 1 | 25 | 75 | 10 | 2.5 | 1.3 | Dimethylisopropylamine |
| Example 2 | 25 | 75 | 10 | 2.5 | 1.3 | Dimethylamino-2-propanol |
| Example 3 | 25 | 75 | 10 | 2.5 | 1.3 | Dimethylaminomethylpropanol |
| Example 4 | 25 | 75 | 10 | 2.5 | 1.3 | Dimethyloctylamine |
| Example 5 | 25 | 75 | 10 | 2.5 | 1.3 | Dimethylaminoethanol |

TABLE 1-continued

| | Alicyclic Epoxy Compound CELLOXIDE 3000 (part by weight) | Oxetane Compound OXT221 (part by weight) | Cationic polymerization Initiator UVI6990 (part by weight) | Pigment MA11 (part by weight) | Pigment Dispersant sol. 24000 (part by weight) | Amines Kind Amount of Amine Added (0.3 part by weight) |
|---|---|---|---|---|---|---|
| Comparative Example 1 | 25 | 75 | 10 | 2.5 | 1.3 | — |
| Comparative Example 2 | 25 | 75 | 10 | 2.5 | 1.3 | Methyldiethanolamine |
| Comparative Example 3 | 25 | 75 | 10 | 2.5 | 1.3 | Diethylaminoethanol |
| Comparative Example 4 | 25 | 75 | 10 | 2.5 | 1.3 | Diethylamino-2-propanol |
| Comparative Example 5 | 25 | 75 | 10 | 2.5 | 1.3 | Tributylamine |
| Comparative Example 6 | 25 | 75 | 10 | 2.5 | 1.3 | Triethanolamine |

The reference characters in Table 1 designate as follows:

CELLOXIDE 3000: 1-methyl-4-(2-methyloxiranyl)-7-oxabicyclo[4,1,0]heptane (Daicel Chemical Industries, Ltd., CELLOXIDE3000 (trade name)).

OXT221: di[1-ethyl(3-oxetanyl)]methyl ether (Toagosei Co., Ltd., OXT221 (trade name)).

UVI6990: sulfonium salt-based cationic polymerization initiator (The Dow Chemical Co., Cyracure (registered trademark) photo-setting initiator UVI-6990 (trade name)).

MA11: carbon black (Mitsubishi Chemical Industries Ltd.).

Sol.24000: pigment dispersant (Avecia Ltd., Solsperse 24000GR (trade name)).

compositions of Examples 1 to 3 and those of Examples 4 to 5 shows that dimethylaminopropanol, dimethylaminomethylpropanol and dimethylisopropylamine achieve higher pigment-dispersion stability, and therefore, are suitable for ink applications.

According to this invention, since a specific tertiary alkanolamine or tertiary alkylamine having the above general formula I is added to a cationically polymerizable composition, in particular, one in which an oxetane compound and an alicyclic epoxy compound are used in combination, the storage stability of the composition is remarkably improved while the good curability of the same is maintained. In addition, the above amines do not degrade the stability of colorant dispersion, and thus a polymerizable composition suitable for ink applications is also provided.

TABLE 2

| | | | Storage stability | | | | Colorant-Dispersion Stability | | | |
|---|---|---|---|---|---|---|---|---|---|---|
| | | | | | | | | | | Particle |
| | Amines Kind | Curability (22 m/min) | Initial ($V_0$) (mPa·S) | 1st Week ($V_1$) (mPa·S) | 4th Week ($V_4$) (mPa·S) | Viscosity Change Rate ($V_4/V_0$) | Initial ($D_0$) (nm) | 1st Week ($D_1$) (nm) | 4th Week ($D_4$) (nm) | Size Change Rate ($D_4/D_0$) |
| Ex. 1 | Dimethylisopropylamine | Good | 14 | 15 | 17 | 1.2 | 63 | 77 | 94 | 1.5 |
| Ex. 2 | Dimethylamino2-propanol | Good | 15 | 19 | 20 | 1.3 | 68 | 71 | 76 | 1.1 |
| Ex. 3 | Dimethylaminomethylpropanol | Good | 15 | 19 | 23 | 1.5 | 74 | 75 | 75 | 1.0 |
| Ex. 4 | Dimethyloctylamine | Good | 15 | 18 | 19 | 1.3 | 77 | 81 | 161 | 2.1 |
| Ex. 5 | Dimethylaminoethanol | Good | 15 | 19 | 20 | 1.3 | 68 | 145 | 170 | 2.5 |
| Com. Ex. 1 | — | Good | 15 | Set | Set | Set | 77 | Set | Set | Set |
| Com. Ex. 2 | Methyldiethanolamine | Good | 15 | 36 | 60< | 4< | 68 | 69 | 74 | 1.1 |
| Com. Ex. 3 | Diethylaminoethanol | Good | 14 | 30 | 60< | 4< | 63 | 69 | 79 | 1.2 |
| Com. Ex. 4 | Diethylamino2-propanol | Good | 14 | 45 | 60< | 4< | 63 | 78 | 88 | 1.4 |
| Com. Ex. 5 | Tributylamine | Good | 15 | 42 | Set | Set | 65 | 77 | Set | Set |
| Com. Ex. 6 | Triethanolamine | Good | 15 | 72 | Set | Set | 64 | 77 | Set | Set |

In Table 2, "Ex." means "Example", and "Com. Ex." means "Comparative Example".

The results shown in Table 2 indicate that the compositions of Examples 1 to 5 all achieve good storage stability, whereas the compositions of Comparative Examples 1 to 3 are poor in storage stability. Further, the comparison of the

What is claimed is:

1. A cationically polymerizable composition, comprising a cationically polymerizable compound selected from the group consisting of vinyl ethers and cyclic ethers, a cationic polymerization initiator and a compound having the following general formula I:

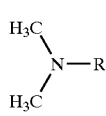
(I)

wherein R is a group represented by —$(C_nH_{2n})$OH wherein n is an integer of 2 or more or by —$(C_mH_{2m+1})$ wherein m is an integer of 3 or more and R may be either a straight-chain or branched-chain.

2. The cationically polymerizable composition, comprising a cationically polymerizable compound, a cationic polymerization initiator and a compound having the following general formula I:

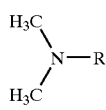
(I)

wherein R is a group represented by $(C_nH_{2n})$OH wherein n is an integer of 2 or more or —$(C_mH_{2m+1})$ wherein m is an integer of 3 or more and may be either of straight-chain or branched-chain, and the cationically polymerizable compound comprises an alicyclic epoxy compound and an oxetane compound.

3. The cationically polymerizable composition according to claim 1 or 2, wherein the compound having the general formula I is present in an amount of 0.01 to 1.0% by weight based on the total of the cationically polymerizable composition.

4. The cationically polymerizable composition according to claim 1, wherein the cationic polymerizable initiator is present in an amount of 0.1 to 20 parts by weight based on 100 parts by weight of the cationically polymerizable compound.

5. The cationically polymerizable composition according to claim 1, wherein R of the compound having the general formula I is a group represented by —$(C_nH_{2n})$OH wherein n is an integer of 2 to 4 or by —$(C_mH_{2m+1})$ wherein m is an integer of 3 to 8.

6. The cationically polymerizable composition according to claim 1, which has a viscosity of 5 mPa·s to 50 mPa·s at 23° C.

7. A cationically polymerizable composition, comprising a cationically polymerizable compound, a cationic polymerization initiator and a compound having the following general formula I:

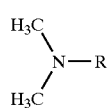
(I)

wherein R is a group represented by —$(C_nH_{2n})$OH wherein n is an integer of 2 or more or by —$(C_mH_{2m+1})$ wherein m is an integer of 3 or more and may be either of straight-chain or branched-chain, and the composition further comprises a colorant.

8. The cationically polymerizable composition according to claim 2, wherein the cationic polymerizable initiator is present in an amount of 0.1 to 20 parts by weight based on 100 parts by weight of the cationically polymerizable compound.

9. The cationically polymerizable composition according to claim 2, wherein R of the compound having the general formula I is a group represented by —$(C_nH_{2n})$OH wherein n is an integer of 2 to 4 or by —$(C_mH_{2m+1})$ wherein m is an integer of 3 to 8.

10. The cationically polymerizable composition according to claim 2, which has a viscosity of 5 mPa·s to 50 mPa·s at 23° C.

* * * * *